April 21, 1959     R. H. G. PAINTER     2,882,749
WINDSCREEN WIPER DRIVE MECHANISM
Filed Nov. 7, 1955
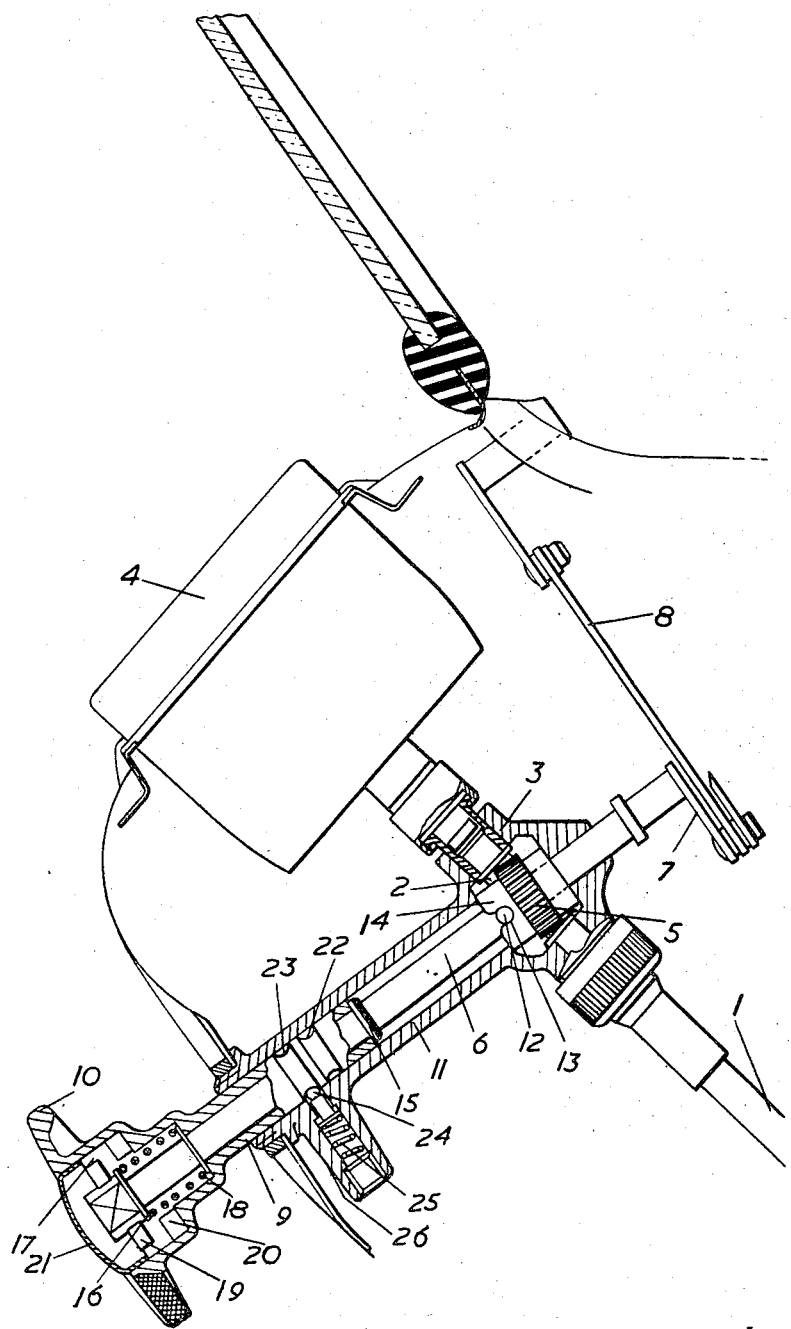
Inventor
REX HENRY GEORGE PAINTER
By Craig V. Morton
Attorney

Patent document

2,882,749
WINDSCREEN WIPER DRIVE MECHANISM

Rex H. G. Painter, Luton, England, assignor to General Motors Corporation, Detroit, Mich., a corporation of Delaware Application November 7, 1955, Serial No. 545,488

Claims priority, application Great Britain November 18, 1954

4 Claims. (Cl. 74—625)

This invention relates to mechanical drives for windscreen wipers, for example, those which are driven from a vehicle speedometer drive cable. Such mechanical drives have incorporated a driven gearwheel on the wiper actuator shaft which is disengaged from a cooperating gear on the speedometer cable when it is desired to discontinue operation of the windscreen wiper.

By the present invention a windscreen wiper can be driven from a speedometer drive cable or the like by means of a gearwheel which is constantly in mesh with a cooperating gear on the speedometer drive cable or the like.

Accordingly a mechanical drive for a windscreen wiper comprises a driven gearwheel through which extends a coaxial, rotatable, wiper actuator shaft which is adapted to be moved axially by a manual control member between a position in which clutch parts on the shaft and gearwheel are interengaged and a position in which the clutch parts are disengaged.

Preferably the manual control member comprises a coaxial sleeve in which the shaft is rotatable and which has direct engagement with the shaft in the direction for engagement of the clutch parts and engagement through resilient means in the direction for disengaging the clutch parts.

The sleeve may be resiliently held in each of two positions corresponding to the engagement and disengagement of the clutch parts.

In order to enable the windscreen wiper to be operated manually, the manual control member may be movable beyond the position for disengagement of the clutch parts, against the resilient means to engage clutch parts on the shaft and manual control member.

The scope of the invention is indicated by the appended claims; and how it can be carried into effect is hereinafter particularly described, with reference to the accompanying drawing which shows a sectional elevation of a windscreen wiper drive mechanism according to the invention, and adjacent parts of the dashboard and windscreen of a motor vehicle in which it is installed.

A speedometer drive cable 1 drives a worm gear 2 journaled in a housing 3 through which the drive cable 1 extends to drive the speedometer 4, and the worm gear 2 meshes with a worm wheel 5 journaled upon a coaxial rotatable shaft 6 mounted at one end in the housing 3. The worm 2 constitutes a driving element and the worm wheel 5 constitutes a driven element. The shaft 6 extends at the one end through the housing 3 and is connected to a crank arm 7 and linkage 8 by which a pair of windscreen wipers (not shown) are oscillated during rotation of the shaft 6. The connection between the shaft 6 and housing 3 is a slidable one to permit axial movement of the shaft. Axial movement of the shaft 6 is permitted due to flexure of the link 8. At its other end the shaft 6 is journaled in a sleeve 9, constituting part of a manual control knob 10 and journaled in a tubular extension 11 of the housing 3.

The shaft is transfixed by a pin 12 the ends of which extend radially outwards and are adapted to engage in diametrically opposed axial slots 13 in the periphery of a hub 14 integral with the worm wheel 5.

The shaft 6 has a first shoulder 15 which is in direct engagement with the inner end of the sleeve 9 of the manual control knob 10 and a second shoulder 16 within a recess 17 in the head of the knob 10 and between which and the sleeve 9 is disposed a helical compression spring 18. This end of the shaft is also transfixed by a pin 19 the ends of which are adapted to engage diametrically opposed axial slots 20 in the base of the recess 17 in the knob 10. The recess 17 in the knob 10 is closed by a cap member 21.

The pins 12 and 19 and slots 13, 20 constitute clutch parts.

The sleeve 9 of the manual control knob 10 has two peripheral grooves 22, 23 into one of which a spring pressed ball 24 can enter resiliently under the action of a spring 25 housed in a lateral protrusion 26 of the housing extension 11 to hold the sleeve 9 in one of two axial positions.

In operation the worm gear 2 is constantly driven by the speedometer drive cable 1 while the vehicle is in motion and if it is desired to operate the windscreen wipers the manual knob 10 is pushed inwardly so that the sleeve 9 directly engages the first shoulder 15 on the shaft 6 and moves the shaft axially to interengage the ends of the pin 12 on the shaft 6 with the slots 13 on the worm wheel 5. Thus the shaft 6 is clutched to the worm wheel 5 driven by the worm gear 2 and rotary movement is given to the crank 7 by which the windscreen wipers are oscillated. The manual control knob sleeve 9 is held in this position by the spring pressed ball 24 which enters the peripheral groove 23 in the sleeve 9.

When it is desired to stop operation of the windscreen wipers the manual knob 10 is pulled out and the compression spring 18 is compressed so that the actuator shaft 6 is moved axially to withdraw the ends of the pin 12 from the slots 13 in the worm wheel hub 14. Thus the shaft 6 is declutched from the worm wheel 5 and the sleeve 9 is held in this position by the spring pressed ball 24 which now enters the other peripheral groove 22.

If manual operation of the windscreen wipers is required, for example, when the vehicle is stationary, the manual control knob 10 is moved beyond the position in which the shaft 6 is declutched from the worm wheel 5 to engage the ends of the pin 19 on the shaft 6 with the slots 20 in the manual control knob 10. The manual control knob 10 can then be rotated by hand to oscillate the windscreen wipers. Upon release of the manual control knob 10 the compression spring 18 declutches the knob 10 from the shaft 6 and the sleeve 9 returns to the position in which both clutches 12, 13 and 19, 20 are disengaged.

I claim:

1. A mechanical drive mechanism for a windscreen wiper, comprising a driven gear wheel, a rotatable wiper actuator shaft extending coaxially through said gear wheel, clutch parts on said shaft and said gear wheel, a manually operable control member engageable with said shaft to effect axial movement thereof to a first position in which the clutch parts on said shaft and said gear wheel are engaged and a second position in which the clutch parts are disengaged, and further clutch parts on said shaft and said control member engageable upon axial movement of said shaft to a third position in which the shaft is disengaged from said gear wheel but manually rotatable by said control member.

2. A mechanical drive mechanism for a vehicle windscreen wiper, comprising a housing, a first gear journaled in said housing and arranged for drive by a moving part of the vehicle, a second gear driven by said first gear, a rotatable wiper actuator shaft journaled at one end in said housing and extending coaxially through said second gear, clutch parts on said shaft and said second gear, and a manually operable control member journaled on the other end of said shaft and in said housing and axially movable in said housing to engage said shaft to effect axial movement thereof between a first position in which the clutch parts on said shaft and said second gear are engaged and a second position in which the clutch parts are disengaged, and further clutch parts on said shaft and said control member engageable to couple said shaft to said control member for drive of said shaft by manual actuation of said control member, upon axial movement of said shaft to a third position beyond that in which the first said clutch parts are disengaged.

3. A mechanical drive mechanism for a windscreen wiper, comprising a housing, a worm gear journaled in said housing and arranged for drive by a speedometer drive cable, a worm wheel constantly in mesh with said worm gear and journaled on a rotatable wiper actuator shaft journaled at one end in said housing and extending coaxially through said worm wheel, clutch parts on said shaft and said worm wheel, and a manually operable control member slidably journaled on the other end of said shaft and in said housing and axially movable in one direction to engage a first abutment on said shaft and effect axial movement thereof to a first position in which the clutch parts on said shaft and said gear wheel are engaged, and in the opposite direction to engage a second, resilient, abutment on said shaft and effect axial movement thereof to a second position in which said clutch parts are disengaged; and further clutch parts on said control member and on said other end of said shaft engageable upon movement of said control member in said opposite direction beyond said second position to a third position to permit manual operation of said shaft by said control member.

4. A mechanical drive mechanism for a windscreen wiper as claimed in claim 3, in which said control member is formed with a pair of axially spaced peripheral grooves and said housing has therein a resilient detent engageable with either of said grooves upon movement of said shaft and said control member between said first and second positions to secure said shaft in its adjusted position.

References Cited in the file of this patent

UNITED STATES PATENTS

| | | |
|---|---|---|
| 1,771,703 | Berill | July 29, 1930 |
| 2,031,830 | Hansman | Feb. 25, 1936 |
| 2,242,027 | Fishburn | May 13, 1941 |
| 2,538,432 | Sivacek | Jan. 16, 1951 |

FOREIGN PATENTS

| | | |
|---|---|---|
| 583,422 | Great Britain | Dec. 18, 1946 |
| 744,800 | Germany | Jan. 26, 1944 |